(12) United States Patent
Lee et al.

(10) Patent No.: US 12,511,509 B2
(45) Date of Patent: *Dec. 30, 2025

(54) LOGISTICS CONTROL SYSTEM AND METHOD BY USING CAMERA

(71) Applicant: HANWHA VISION CO., LTD., Seongnam-si (KR)

(72) Inventors: Jong Seo Lee, Seongnam-si (KR); Woo Cheol Jeong, Seongnam-si (KR); Joon Tek Lee, Seongnam-si (KR); Woo Won Ra, Seongnam-si (KR); Woong Jeon, Seongnam-si (KR)

(73) Assignee: Hanwha Vision Co., Ltd., Seongnam-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/915,579

(22) Filed: Oct. 15, 2024

(65) Prior Publication Data

US 2025/0148245 A1    May 8, 2025

Related U.S. Application Data

(63) Continuation of application No. 18/124,844, filed on Mar. 22, 2023, now Pat. No. 12,147,859.

(30) Foreign Application Priority Data

Aug. 3, 2022 (KR) .................. 10-2022-0096753

(51) Int. Cl.
*G06K 19/06* (2006.01)
*G06Q 10/087* (2023.01)

(52) U.S. Cl.
CPC ..... *G06K 19/06028* (2013.01); *G06Q 10/087* (2013.01)

(58) Field of Classification Search
CPC .................. G06K 19/06028; G06Q 10/087
USPC .................................................. 235/462.01
See application file for complete search history.

(56) References Cited

U.S. PATENT DOCUMENTS

| | | | |
|---|---|---|---|
| 10,832,206 B2* | 11/2020 | Lafrance | G06F 16/29 |
| 12,141,652 B1* | 11/2024 | Kotlarsky | G06K 7/1413 |
| 2014/0111346 A1* | 4/2014 | Pinn | H04Q 1/09 |
| | | | 340/691.6 |
| 2014/0291400 A1* | 10/2014 | Olmstead | G07G 1/0045 |
| | | | 235/440 |
| 2018/0203027 A1* | 7/2018 | Yasuzawa | G01N 35/00732 |

(Continued)

*Primary Examiner* — Allyson N Trail
(74) *Attorney, Agent, or Firm* — McLean IP Global; Jason Y. Pahng

(57) ABSTRACT

A logistics control system includes: a processor configured to control an operation of the logistics control system; and a memory storing instructions executable by the processor, wherein the processor is configured to execute the instructions to: obtain barcode information about an article from a barcode information obtaining module provided in the logistics control system and configured to obtain the barcode information attached to the article; obtain image information about the article from an image information obtaining module configured to obtain the image information about the article by synchronizing a photographing time point of the barcode information obtaining module with a photographing time point of the barcode information obtaining module; and monitor the article based on the barcode information and the image information.

7 Claims, 10 Drawing Sheets

(56) References Cited

U.S. PATENT DOCUMENTS

| | | | |
|---|---|---|---|
| 2021/0142276 A1* | 5/2021 | Gupte | G06Q 10/06315 |
| 2024/0013139 A1* | 1/2024 | Levy | G07F 17/10 |
| 2025/0053768 A1* | 2/2025 | Decoux | G06K 19/06075 |

* cited by examiner

LOGISTICS CONTROL SYSTEM AND METHOD BY USING CAMERA

CROSS-REFERENCE TO RELATED APPLICATION

This application is a continuation application of U.S. patent application Ser. No. 18/124,844, filed on Mar. 22, 2023, which is hereby incorporated by reference in its entirety. In addition, this application claims priority under 35 U.S.C. § 119 to Korean Patent Application no. 10-2022-0096753, filed on Aug. 3, 2022, in the Korean Intellectual Property Office, the disclosure of which is incorporated by reference herein in its entirety.

BACKGROUND

1. Field

Embodiments of the disclosure relate to a logistics control system and method by using a camera.

2. Description of the Related Art

A user may obtain barcode information about an article to check a distribution process of the article in a logistics system. Also, when a problem, such as loss of an article, occurs, the user may check a movement state of an article by directly searching barcode information about the article.

According to the related art, a user has difficulty in directly checking that a problem has occurred in a logistics process by checking barcode information, and has difficulty in directly searching and finding whether a problem article exists or the current location of an article.

SUMMARY

Provided is a logistics control system and method using a camera. However, these problems are illustrative, and the scope of the disclosure is not limited thereto.

Various aspects of the disclosure will be set forth in part in the description which follows and, in part, will be apparent from the description, or may be learned by practice of the presented embodiments of the disclosure.

According to an aspect of the disclosure, there is provided a logistics control system which may include: a processor configured to control an operation of the logistics control system; and a memory storing instructions executable by the processor, wherein the processor is configured to execute the instructions to: obtain barcode information about an article from a barcode information obtaining module provided in the logistics control system and configured to obtain the barcode information attached to the article; obtain image information about the article from an image information obtaining module configured to obtain the image information about the article by synchronizing a photographing time point of the barcode information obtaining module with a photographing time point of the barcode information obtaining module; and monitor the article based on the barcode information and the image information.

The processor may be further configured to execute the instructions to obtain barcode information about articles respectively from a first barcode information obtaining module provided at a first location and a second barcode information obtaining module provided at a second location.

The processor may be further configured to execute the instructions to obtain image information about articles respectively from a first image information obtaining module provided at the first location and having a photographing time point synchronized with a photographing time point of the first barcode information obtaining module, and a second image information obtaining module provided at the second location and having a photographing time point synchronized with a photographing time point of the second barcode information obtaining module.

The processor may be further configured to execute the instructions to obtain calculate a number of articles by recognizing the articles based on the image information obtained from the first image information obtaining module and the second image information obtaining module.

The processor may be further configured to execute the instructions to obtain monitor moving states of the articles in the logistics control system based on first barcode information and first image information about the articles at the first location and second barcode information and second image information about the articles at the second location.

The processor may be further configured to execute the instructions to find out an article with an unrecognized barcode by comparing article information in the first barcode information with article information in the first image information, and recognize barcode information about the article with the unrecognized barcode by mapping the first barcode information and the first image information to each other.

The processor may be further configured to execute the instructions to determine whether an article is lost between the first location and the second location, based on the first barcode information and the first image information, and the second barcode information and the second image information.

According to an aspect of the disclosure, there is provided a logistics control method using a processor controlling an operation of a logistics control system. The method may include: obtaining barcode information about an article from a barcode information obtaining module provided in the logistics control system and obtaining the barcode information attached to the article; obtaining image information about the article from an image information obtaining module obtaining the image information about the article by synchronizing a photographing time point of the image information obtaining module with a photographing time point of the barcode information obtaining module; and monitoring a moving state of the article based on the barcode information and the image information.

The obtaining of the barcode information may include obtaining barcode information about articles respectively from a first barcode information obtaining module provided at a first location and a second barcode information obtaining module provided at a second location.

The obtaining of the image information may include obtaining image information about articles respectively from a first image information obtaining module provided at the first location and having a photographing time point synchronized with a photographing time point of the first barcode information obtaining module, and a second image information obtaining module provided at the second location and having a photographing time point synchronized with a photographing time point of the second barcode information obtaining module.

The obtaining of the image information may include calculating a number of articles by recognizing the articles based on the image information obtained from the first image information obtaining module and the second image information obtaining module.

The monitoring of the article may include monitoring moving states of the articles in the logistics control system based on first barcode information and first image information about the articles at the first location and second barcode information and second image information about the articles at the second location.

The monitoring of the article further may include finding out an article with an unrecognized barcode by comparing article information in the first barcode information with article information in the first image information, and recognizing barcode information about the article with the unrecognized barcode by mapping the first barcode information and the first image information with each other.

The monitoring of the article may further include determining whether an article is lost between the first location and the second location, based on the first barcode information and the first image information, and the second barcode information and the second image information.

According to an aspect of the disclosure, a computer-readable recording medium includes a computer program stored thereon to execute the method described above by using a computer.

Other aspects, features, and advantages other than those described above will become clear from the detailed description, claims, and drawings for carrying out the disclosure below.

BRIEF DESCRIPTION OF DRAWINGS

The above and other aspects, features, and advantages of certain embodiments of the disclosure will be more apparent from the following description taken in conjunction with the accompanying drawings, in which.

DETAILED DESCRIPTION

Figure 1:
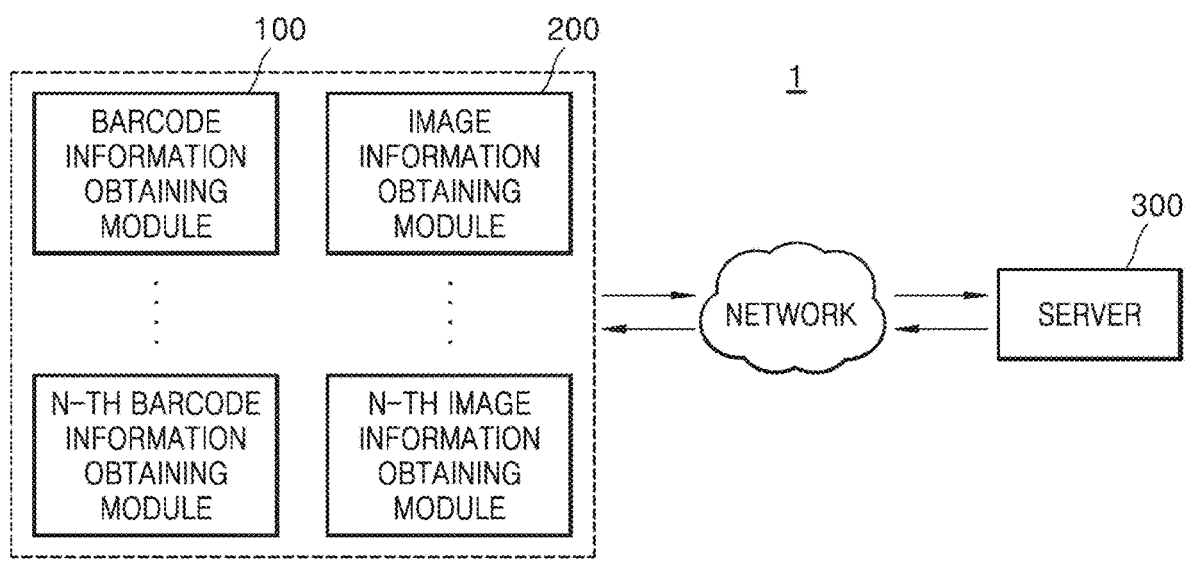
FIG. 1 is a diagram for explaining the configuration and operation of a logistics control system according to an embodiment.

Reference will now be made in detail to embodiments, examples of which are illustrated in the accompanying drawings, wherein like reference numerals refer to like elements throughout. In this regard, the present embodiments, which are example embodiments, may have different forms and should not be construed as being limited to the descriptions set forth herein. Accordingly, the embodiments are merely described below, by referring to the figures, to explain aspects of the present description. As used herein, the term "and/or" includes any and all combinations of one or more of the associated listed items. Expressions such as "at least one of," when preceding a list of elements, modify the entire list of elements and do not modify the individual elements of the list.

The disclosure will now be described more fully with reference to the accompanying drawings, in which exemplary embodiments of the disclosure are shown. Effects and features of the disclosure, and methods for achieving the effects and features will become clear with reference to the embodiments to be described below in detail together with the drawings. The disclosure may, however, be embodied in many different forms and should not be construed as being limited to the embodiments set forth herein.

In the following embodiments, terms as "first," "second," etc., may be used to describe various components, such components must not be limited to the above terms. The above terms are used only to distinguish one component from another. An expression used in the singular encompasses the expression of the plural, unless it has a clearly different meaning in the context. Also, it is to be understood that the terms such as "including," "having," and "comprising" are intended to indicate the existence of the features or components disclosed in the specification, and are not intended to preclude the possibility that one or more other features or components may be added.

Hereinafter, various embodiments of the disclosure will be described in detail with reference to the accompanying drawings so that those skilled in the art can easily practice the disclosure.

FIG. 1 is a diagram for explaining the configuration and operation of a logistics control system according to an embodiment.

Referring to FIG. 1, a logistics control system 1 according to an embodiment may include a barcode information obtaining module 100, an image information obtaining module 200, and a server 300. However, the disclosure is not limited thereto, and the logistics control system 1 may include other additional components or some components may be omitted. Some components of the logistics control system 1 may be separated into a plurality of devices, or a plurality of components may be merged into or implemented in one device.

The barcode information obtaining module 100 may be a device provided in the logistics control system 1 to obtain barcode information about an article. For example, a plurality of barcode information obtaining modules 100 may be provided at drop-off points and loading points in a plurality of terminals of the logistics control system 1. For example, the barcode information obtaining module 100 may be installed in each of drop-off conveyors and loading conveyors of the logistics control system 1 to obtain barcode information about an article which may be attached to an article. As shown in FIG. 1, for example, m number of barcode information obtaining modules 100 and n number of image information obtaining modules 200 may be provided in the logistics control system 1. Here, m and n are an integer greater than 1, and may be equal to or different from each other, The image information obtaining module 200 may be a device provided in the logistics control system 1 to obtain image information about an article. For example, a plurality of image information obtaining modules 200 may be provided at the drop-off points and the loading points in the plurality of terminals of the logistics control system 1. For example, the image information obtaining module 200 may be installed in each of the drop-off conveyors and loading conveyors of the logistics control system 1 to obtain image information about an article.

As the barcode information obtaining modules 100 and the image information obtaining modules 200 are provided in plural, a pair of an i-th barcode information obtaining module 100 and an i-th image information obtaining module 200 may be provided at a same drop-off point (or conveyor) or a same loading point (or conveyor), i being an integer greater than 0, according to an embodiment. However, only one of the barcode information obtaining module 100 and the barcode information obtaining module 200 may be provided at a drop-off point (or conveyor) or a loading point (or conveyor), according to an embodiment.

Also, a photographing time point of the image information obtaining module 200 may be synchronized with a photographing time point of the barcode information obtaining module 100. For example, a time point when the barcode information obtaining module 100 captures or recognizes a barcode of an article may be synchronized with a time point when the image information obtaining module 200 captures an image of the same article. For example, at a time point when the barcode information obtaining module 100 obtains barcode information about an article, the image information obtaining module 200 may obtain image information about the same article at a same time point. Accordingly, the logistics control system 1 may recognize or count articles based on images and barcode information instead of counting articles by using only barcode information.

The server 300 may be a server device that controls operations of the logistics control system 1. For example, the server 300 may be connected to the barcode information obtaining module 100 and the image information obtaining module 200 through a network to exchange data with each other. For example, the server 300 may obtain barcode information about an article from the barcode information obtaining module 100. Also, the server 300 may obtain image information about an article from the image information obtaining module 200. In addition, the server 300 may monitor an article based on the barcode information and the image information about the article.

Figure 2:
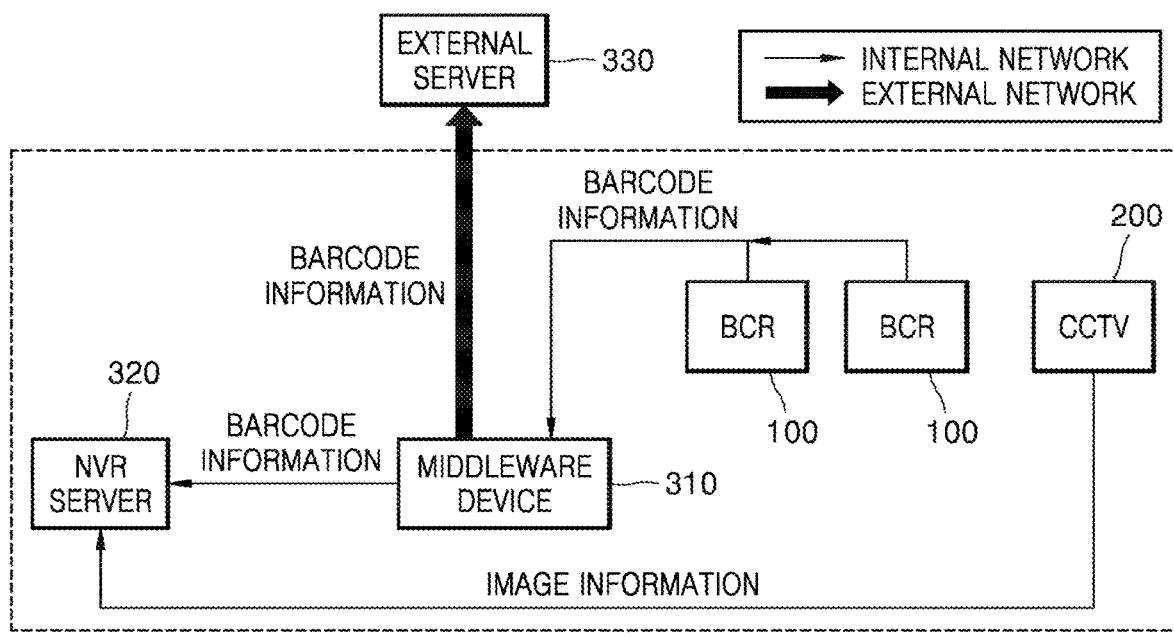
FIG. 2 is a diagram for explaining a logistics control system according to an embodiment.

FIG. 2 is a diagram for explaining a logistics control system according to an embodiment. Also, FIG. 3 is a diagram for explaining a logistics control system according to an embodiment.

First, referring to FIG. 2, the logistics control system according to an embodiment may include the barcode information obtaining module 100, the image information obtaining module 200, a middleware device 310, a network video recorder (NVR) server 320, and an external server 330. For example, the barcode information obtaining module 100 may include a barcode reader (BCR) camera. The BCR camera may obtain barcode information. For example, the image information obtaining module 200 may include a closed-circuit television (CCTV). The CCTV may obtain image information.

Figure 3:
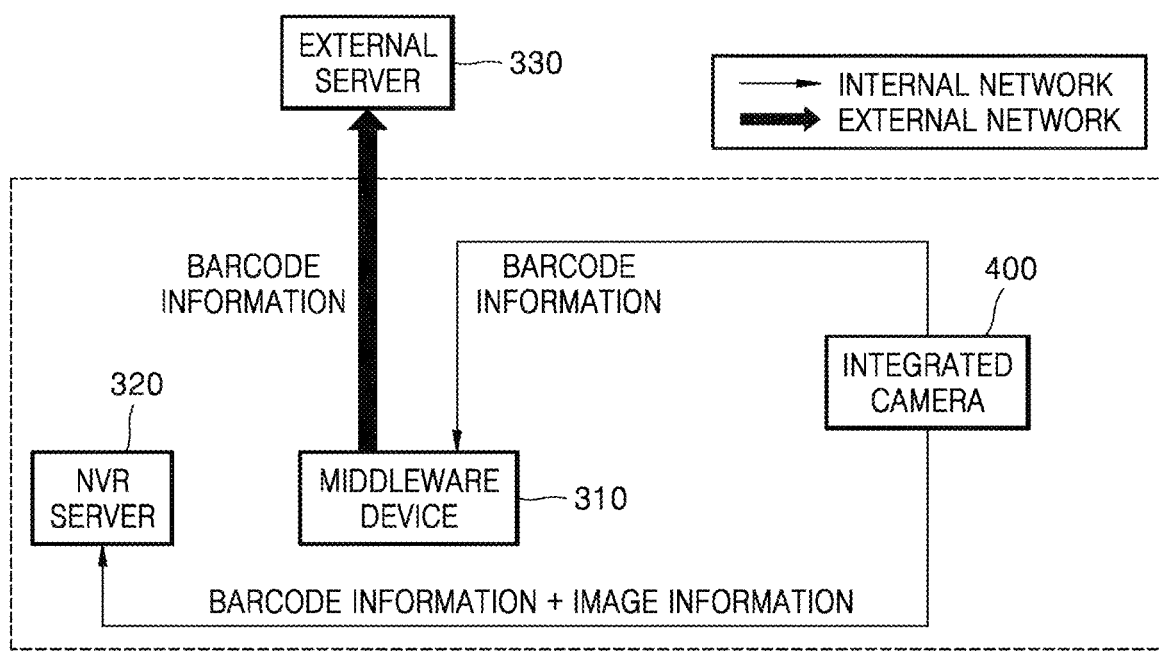
FIG. 3 is a diagram for explaining a logistics control system according to another embodiment.

Also, referring to FIG. 3, the logistics control system according to an embodiment may include an integrated camera 400. For example, the integrated camera 400 may be a device configured to perform functions barcode information obtaining module 100 and the image information obtaining module 200 in one device. For example, the integrated camera 400 may obtain both barcode information and image information.

The NVR server 320 according to an embodiment may obtain barcode information and image information by synchronizing these two pieces of information. For example, the NVR server 320 may store data by tagging based on a time point when data is received into the NVR server 320. For example, as shown in FIG. 2, the NVR server 320 may obtain barcode information by tagging time information to the barcode information, based on a time point at which the barcode information is obtained from the middleware device 310. Also, the NVR server 320 may obtain image information by tagging time information to the image information, based on a time point at which the image information is obtained from the CCTV 200. The NVR server 320 may obtain the barcode information and the image information by synchronizing the two pieces of information, based on the time information tagged to the barcode information and the time information tagged to the image information.

Also, the NVR server 320 may search for an article based on the barcode information. For example, the NVR server 320 may search for image information synchronized with the barcode information, based on the barcode information. In addition, the NVR server 320 may identify an article through the image information synchronized with the barcode information.

The integrated camera 400 shown in FIG. 3 according to an embodiment may have a first channel for transmitting barcode information and a second channel for transmitting barcode information and image information. For example, as shown in FIG. 3, the integrated camera 400 may transmit barcode information to the middleware device 310 through the first channel, according to a request received from the middleware device 310. Also, the integrated camera 400 may transmit barcode information and image information to the NVR server 320 through the second channel, according to a request received from the NVR server 320.

The logistics control system according to an embodiment may include a network including a closed circuit network and an external network. For example, referring to FIGS. 2 and 3, according to an embodiment, the closed circuit network (e.g., an internal network) may be configured between the BCR camera 100—the middleware device 310—the NVR server 320—the CCTV 200 and between the middleware device 310—the integrated camera 400—the NVR server 320. Also, the external network may be configured between the middleware device 310 and the external server 330.

Figure 4:
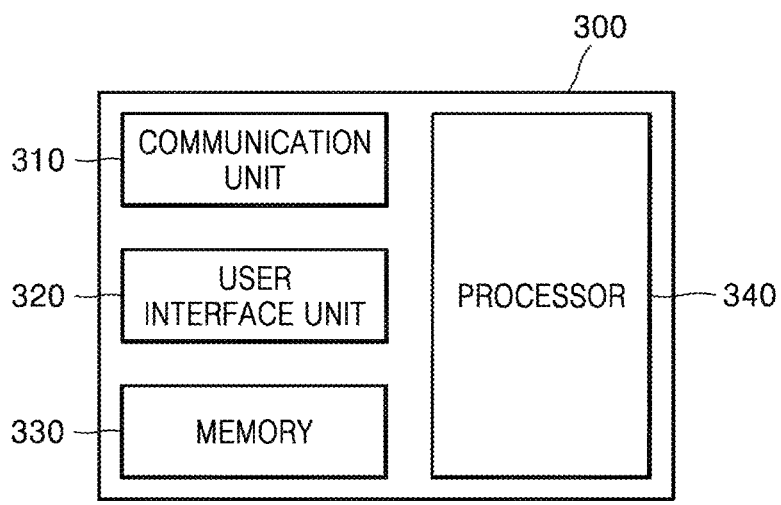
FIG. 4 is a diagram for explaining the configuration of a server included in a logistics control system according to an embodiment.

FIG. 4 is a diagram for explaining a configuration of a server included in a logistics control system according to an embodiment.

Referring to FIG. 4, a server 400 according to an embodiment may include a communication unit 410, a user interface unit 420, a memory 430, and a processor 440. The server 400 may be the same as the server 300 shown in FIG. 1, according to an embodiment. The server 400 may also perform at least a portion of the functions performed by the NVR server 320, the external server 330 and the middleware device 310 shown in FIGS. 2 and 3, according to an embodiment.

The communication unit 410 may provide a function for communicating with an external device through a network. For example, a request generated, by the processor 440 of the server 400, according to a program code stored in a recording device, such as the memory 430, may be transmitted to an external device through a network under the control of the communication unit 410. Conversely, a control signal, command, content, file, or the like provided from the external device may be received by the server 400 through the communication unit 410 via the network. For example, a control signal, command, or the like of the external device received through the communication unit 410 may be transmitted to the processor 440 or the memory 430.

A communication method is not limited, and may include short-distance wireless communication between devices as well as a communication method utilizing a communication network (e.g., a mobile communication network, wired Internet, wireless Internet, broadcasting network) that the network may include. For example, the network may include any one or more of networks, such as personal area network (PAN), local area network (LAN), campus area network (CAN), metropolitan area network (MAN), wide area network (WAN), broadband network (BBN), the Internet, or the like. Also, the network may include any one or more of network topologies including, but not limited to, a bus network, a star network, a ring network, a mesh network, a star-bus network, a tree or hierarchical network, or the like.

In addition, the communication unit 410 may communicate with an external server through a network. A communication method is not limited, but the network may be a short-distance wireless communication network. For example, the network may be Bluetooth, Bluetooth Low Energy (BLE), or a Wi-Fi communication network.

Also, the server 400 according to an embodiment may include the user interface unit 420. The user interface unit 420 may be a unit for interface with an input/output device. For example, the input device may include a device such as a keyboard or mouse, and the output device may include a device such as a display for displaying a communication session of an application. As another example, the user interface unit 420 may also be a unit for interface with a device in which functions for input and output are integrated into one, such as a touch screen. In a more particular example, the processor 440 of the server 400 processes a command of a computer program loaded into the memory 430, such that a service screen or content configured using data provided by an external device may be displayed on the display through the user interface unit 420.

The memory 430 is a computer-readable recording medium and may include random access memory (RAM), read only memory (ROM), and permanent mass storage device such as a disk drive. Also, program code for controlling a logistics control system may be temporarily or permanently stored in the memory 430.

The processor 440 may obtain barcode information from the barcode information obtaining module 100 provided in the logistics control system 1 and obtaining barcode information about an article, the barcode information being attached to the article. Also, the processor 440 may obtain image information from the image information obtaining module 200 that obtains image information about an article by synchronizing a photographing time point thereof with that of the barcode information obtaining module 100. Also, the processor 440 may monitor an article based on the barcode information and the image information.

Hereinafter, a detailed operation of the processor 440 is described with reference to a flowchart of a logistics control method of FIG. 5.

Figure 5:
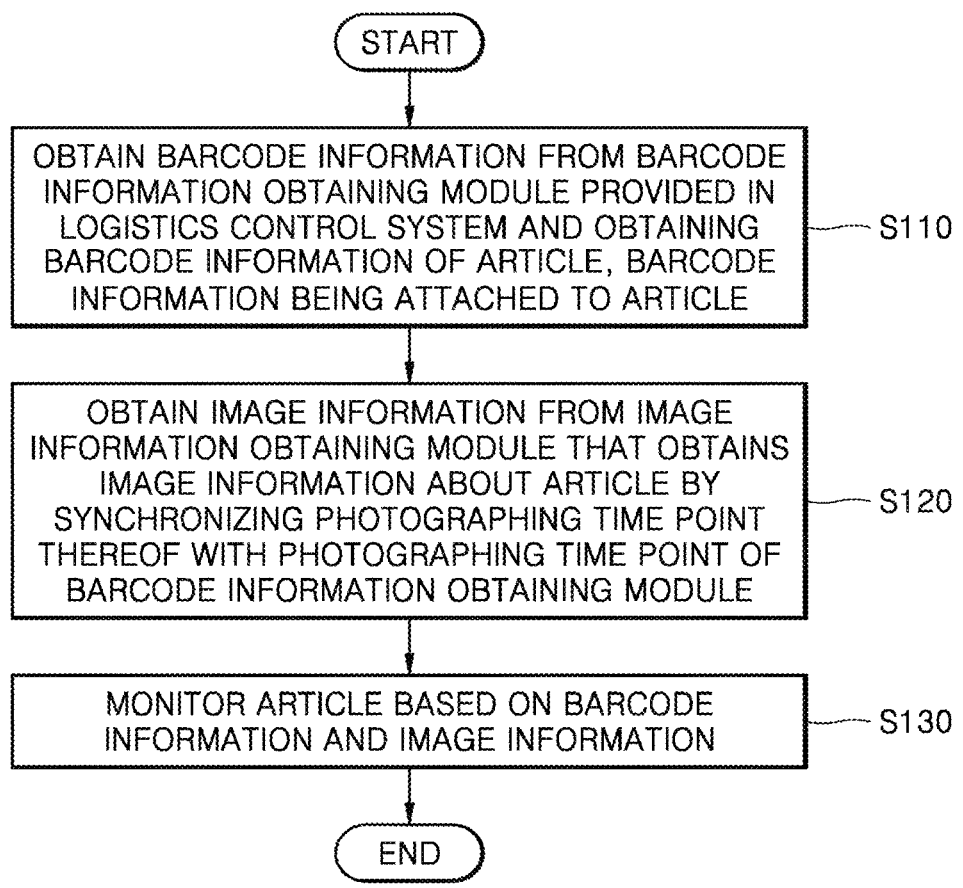
FIG. 5 is a flowchart showing a logistics control method according to an embodiment.

FIG. 5 is a flowchart showing a logistics control method according to an embodiment.

Referring to FIG. 5, in operation S110, the processor 440 may obtain barcode information from a barcode information obtaining module provided in a logistics control system and obtaining barcode information about an article. The barcode information may be attached to the article. For example, the barcode information obtaining module may obtain barcode information about an article moving on a conveyor, and transmit the obtained barcode information to the processor 440. For example, barcode information about an article may include information such as an invoice number, a barcode number, and a barcode included in an invoice attached to the article.

The barcode information obtaining module 100 may obtain barcode information for each of a plurality of articles moving on a conveyor of the logistics control system. For example, the barcode information obtaining module 100 may obtain barcode information about an article that passes a predetermined zone on a conveyor at a time point when the article passes the predetermined zone on the conveyor.

The processor 440 according to an embodiment may obtain barcode information about articles respectively from a first barcode information obtaining module provided at a first location and a second barcode information obtaining module provided at a second location. For example, the processor 440 may obtain barcode information from the first barcode information obtaining module provided at the first location, which is a drop-off point in a terminal. Also, the processor 440 may obtain barcode information from the second barcode information obtaining module provided at the second location, which is a loading point in the terminal.

In operation S120, the processor 440 may obtain image information from an image information obtaining module that obtains image information about an article by synchronizing a photographing time point thereof with that of the barcode information obtaining module. For example, the image information obtaining module may obtain image information about an article moving on a conveyor, and transmit the obtained image information to the processor 440. For example, image information about an article may include information such as a video or image of the article moving on the conveyor.

The image information obtaining module may obtain image information about each of a plurality of articles moving on a conveyor of the logistics control system. For example, the image information obtaining module may obtain image information about an article that passes a predetermined zone on a conveyor at a time point when the article passes the predetermined zone on the conveyor.

In addition, the image information obtaining module 200 may obtain image information about an article at the same time point as a time point when the barcode information obtaining module 100 obtains barcode information about an article. The article of which the image information is obtained by the image information obtaining module 200 may be the same article of which the barcode information is obtained by the barcode information obtaining module 100. That is, the photographing time point of the barcode information obtaining module 100 may be synchronized with the photographing time point of the image information obtaining module 200, so that the barcode information obtaining module 100 and the image information obtaining module 200 may match and obtain barcode information and image information about each of a plurality of articles moving on a conveyor.

The processor 440 according to an embodiment may obtain image information about articles respectively from a first image information obtaining module and a second image information obtaining module. The first image information obtaining module is provided at the first location and having a photographing time point synchronized with that of the first barcode information obtaining module, and the second image information obtaining module is provided at the second location and having a photographing time point synchronized with that of the second barcode information obtaining module.

In addition, the processor 440 according to an embodiment may calculate the number of articles by recognizing articles, based on image information obtained from the first image information obtaining module and the second image information obtaining module. For example, the processor 440 may calculate the number of articles passing through the first location, based on the image information obtained by the first image information obtaining module provided at the first location. Also, the processor 440 may calculate the number of articles passing through the second location, based on the image information obtained by the second image information obtaining module provided at the second location.

In operation S130, the processor 440 may monitor an article based on the barcode information and the image information. For example, the processor 440 may monitor a moving state of an article in the logistics control system based on the barcode information and the image information about the article.

The processor 440 according to an embodiment may monitor moving states of articles in the logistics control system, based on first barcode information and first image information about an article at the first location, and second barcode information and second image information about an article at the second location. For example, the processor 440 may monitor moving states of a plurality of articles, based on barcode information and image information about each of the plurality of articles at the first location, which is a drop-off point in a terminal, and barcode information and image information about each of the plurality of articles at the second location, which is loading point in the terminal.

Also, the processor 440 according to an embodiment may find out an article with an unrecognized barcode by comparing article information in the first barcode information with article information in the first image information. In addition, the processor 440 may recognize barcode information about an unrecognized article by mapping the first barcode information and the first image information. For example, the processor 440 may find out an article with an unrecognized barcode by comparing a list of articles passing through the first location, which is identified based on the barcode information, with a list of articles passing through the first location, which is identified based on the image information.

Also, the processor 440 according to an embodiment may determine whether an article is lost between the first location and the second location, based on the first barcode information and the first image information, and the second barcode information and the second image information. For example, the processor 440 may determine whether an article is lost between the first location and the second location, based on a list of articles at the first location, which is identified through the first barcode information and the first image information, and a list of articles at the second location, which is identified through the second barcode information and the second image information.

Figure 6:
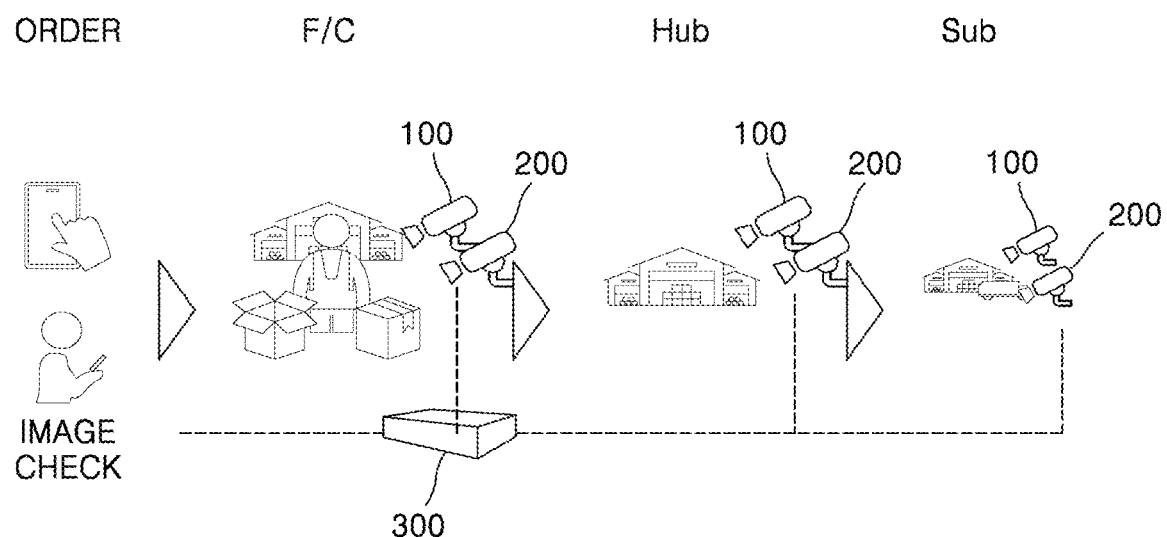
FIGS. 6 and 7 are diagrams for explaining operations of a logistics control system according to an embodiment.
Figure 7:
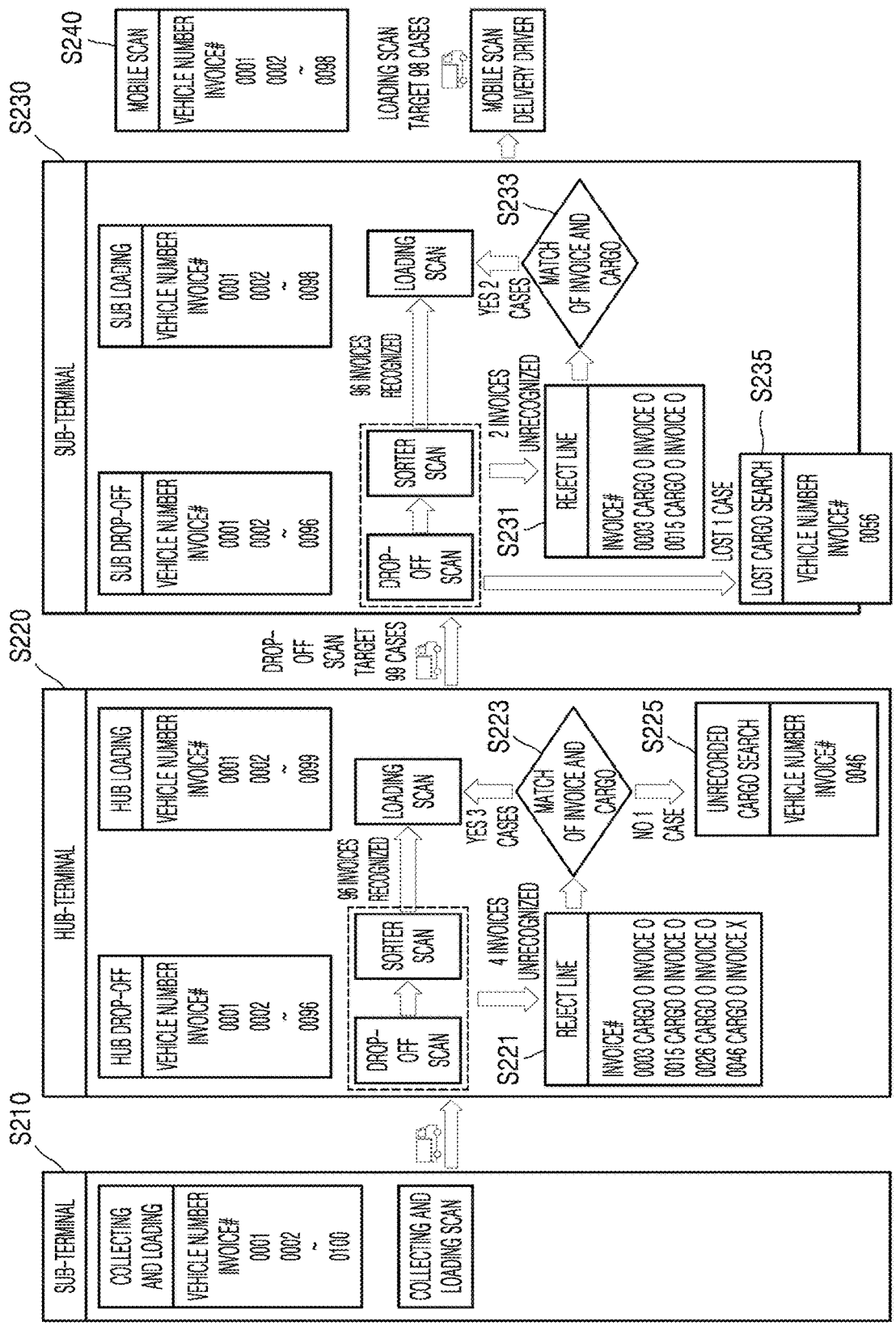
Figure 8:
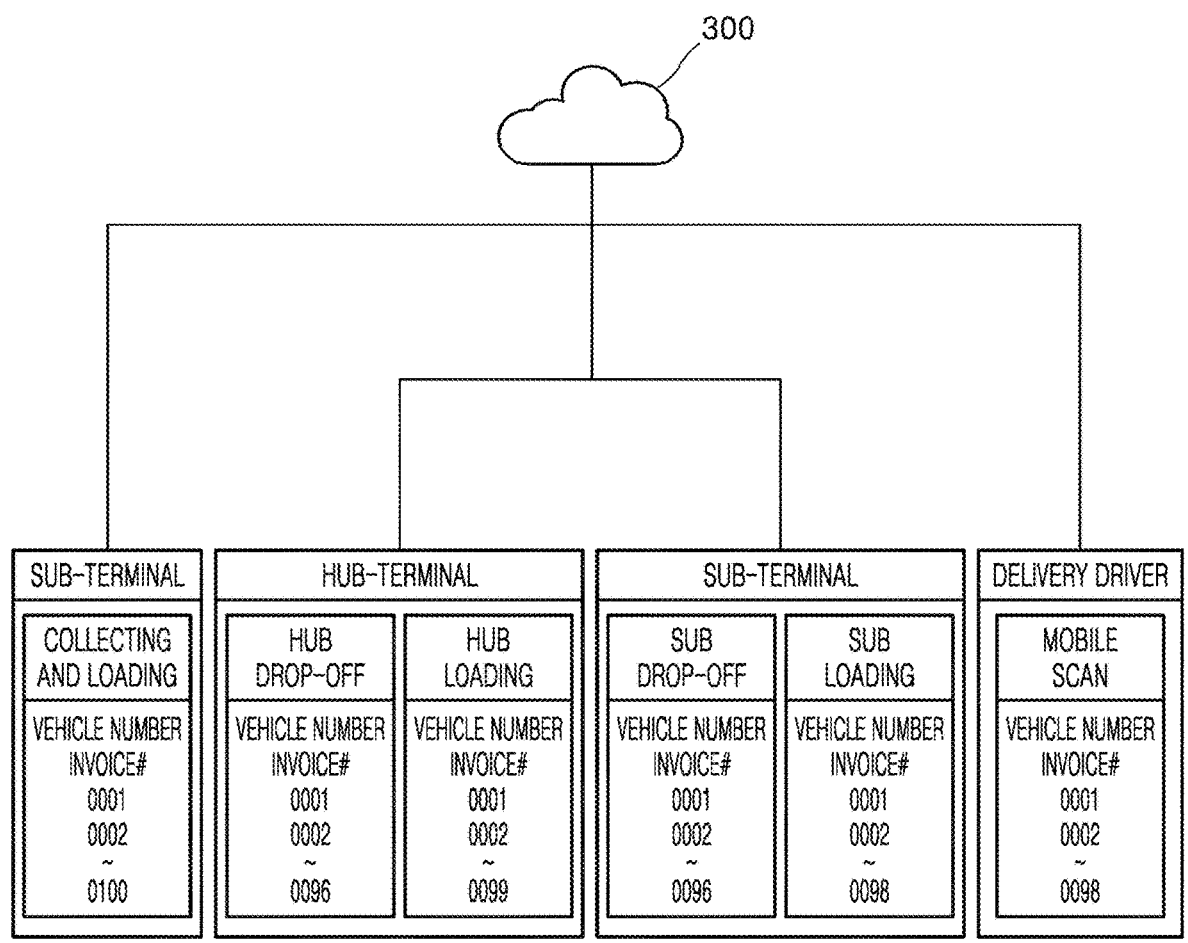
FIG. 8 is a diagram for explaining an operation of a server of a logistics control system according to an embodiment.

FIGS. 6 and 7 are diagrams for explaining operations of a logistics control system according to an embodiment. Also, FIG. 8 is a diagram for explaining an operation of a server of a logistics control system according to an embodiment.

Referring to FIG. 6, according to an embodiment, a logistics control system in which the barcode information obtaining module 100 and the image information obtaining module 200 are provided in each logistics terminal is shown. Here, the barcode information obtaining module 100 and the image information obtaining module 200, which are provided in each logistics terminal, may each be connected to the server 400 through a network.

According to an embodiment, based on synchronized barcode information and image information, an integrated solution for picking and packing processes may be provided, and end-to-end images may be provided. Accordingly, evidence data for picking errors and packing errors may be provided, and articles in a logistics system may be tracked.

FIG. 7 shows an operation of a logistics control system according to an embodiment according to a logistics flow.

According to the need for tracking and management when a troubled cargo occurs (unrecorded/lost/stolen) in a logistics process, the logistics control system according to an embodiment may check lost/stolen/deviation/unrecorded cases early enough through searching for remaining articles in individual terminals of Hub and Sub. Also, the logistics control system according to an embodiment may search for remaining articles between centers by grouping hub-terminals, sub-terminals, and delivery drivers based on cloud linkage. In addition, the logistics control system according to an embodiment may detect the possibility of the occurrence of conflict for each process at an early stage through an image-based article counting solution.

Also, according to an embodiment, in a logistics process, unrecorded cargo invoice tracking and matching solutions may be provided to prevent an accident in which delivery cannot proceed when an invoice is dropped off. For example, according to an embodiment, in the tracking of unrecorded cargo invoices, an original invoice may be matched with an unrecorded cargo by checking the original invoice of an article based on images by tracking a delivery history through before/after cargo invoice images.

For example, as shown in FIG. 7, in operation S210, in a sub-terminal, 100 invoice numbers and 100 images with respect to 100 articles may respectively be obtained through a barcode information obtaining module and an image information obtaining module. For example, the 100 images may represent 100 image frames at the same time points as 100 times of barcode obtaining time points of which the barcode information obtaining module obtains barcode information for an image captured by the image information obtaining module.

For example, referring to FIG. 8 together, information on vehicle numbers, invoice numbers 1 to 100, and images 1 to 100 at collecting and loading points in a sub-terminal may be stored in the server 300. For example, the server 300 may be a cloud server.

In operation S220, at a hub drop-off point in a hub-terminal, 96 invoice numbers and 100 images with respect to 100 articles may be respectively obtained through the barcode information obtaining module and the image information obtaining module. Also, at a hub loading point, 99 invoice numbers and 99 images with respect to 99 articles may respectively obtained through the barcode information obtaining module and the image information obtaining module.

For example, referring to FIG. 8 together, information on vehicle numbers, invoice numbers, and images at hub drop-off and hub loading points of the hub-terminal may be stored in the server 300. For example, the server 300 may be a cloud server.

In operation S221, at the hub drop-off point of the hub-terminal, an article with an unrecognized invoice may be found out based on barcode information and image information respectively obtained through the barcode information obtaining module and the image information obtaining module. For example, as shown in FIG. 7, articles with invoice numbers 3, 15, 26 and 46 are cargoes for which the number of articles is counted in obtained image information but are cargoes for which barcode information has not been identified within obtained barcode information. Here, articles with invoice numbers 3, 15 and 26 are cargoes with invoices attached thereto, but the barcodes thereof are not recognized. The article with invoice number 46 is a cargo without an invoice attached thereto. In this case, the article with invoice number 46 may have been dropped out in a logistics process. For example, an invoice may include barcode information.

In operation S223, an invoice and an article may be matched for an unrecognized article based on the barcode information and the image information respectively obtained through the barcode information obtaining module and the image information obtaining module. For example, as shown in FIG. 7, articles and invoices may be matched for the articles with invoice numbers 3, 15 and 26, based on barcode information and image information, which have synchronized photographing time points with respect to the articles with invoice numbers 3, 15 and 26.

In operation S225, an original invoice and an article may be matched with respect to an article of which the invoice is dropped off, based on the barcode information and the image information respectively obtained through the barcode information obtaining module and the image information obtaining module. For example, as shown in FIG. 7, an original invoice may be matched with the article with invoice number 46, based on original invoice information and image information obtained in the sub-terminal in operation S210 and image information obtained in the hub-terminal in operation S220 with respect to the article with invoice number 46, from which the invoice is dropped off.

In operation S230, at a sub drop-off point of the sub-terminal, 96 invoice numbers and 98 images with respect to 99 articles may be respectively obtained through the barcode information obtaining module and the image information obtaining module. Also, at a sub loading point, 98 invoice numbers and 98 images with respect to 98 articles may respectively obtained through the barcode information obtaining module and the image information obtaining module.

For example, referring to FIG. 8 together, information on vehicle numbers, invoice numbers, and images at the sub drop-off and sub loading points of the sub-terminal may be stored in the server 300. For example, the server 300 may be a cloud server.

In operation S231, at the sub drop-off point of the sub-terminal, an article with an unrecognized invoice may be found out based on barcode information and image information respectively obtained through the barcode information obtaining module and the image information obtaining module. For example, as shown in FIG. 7, articles with invoice numbers 3 and 15 are cargoes for which the number of articles is counted in obtained image information but are cargoes for which barcode information has not been identified within obtained barcode information. Here, the articles with invoice numbers 3 and 15 are cargoes having invoices attached thereto but whose barcodes are not recognized. For example, an invoice may include barcode information.

In operation S233, an invoice and an article may be matched for an unrecognized article based on the barcode information and the image information respectively obtained through the barcode information obtaining module and the image information obtaining module. For example, as shown in FIG. 7, articles and invoices may be matched for the articles with invoice numbers 3 and 15, based on barcode information and image information, which have synchronized photographing time points with respect to the articles with invoice numbers 3 and 15.

In operation S235, lost articles may be searched for based on a plurality pieces of barcode information and image information obtained through a plurality of barcode information obtaining modules and image information obtaining modules. For example, as shown in FIG. 7, an article with invoice number 56 may be searched for based on the barcode information and the image information obtained at the hub loading point of the hub-terminal in operation S220 and the barcode information and the image information obtained at the sub drop-off point of the sub-terminal in operation S230.

In operation S240, at a delivery driver loading point, 98 invoice numbers and 98 images for 98 articles may be respectively obtained through the barcode information obtaining module and the image information obtaining module. For example, referring to FIG. 8, information on vehicle numbers, invoice numbers 1 to 98, and images 1 to 98 at the delivery driver loading point may be stored in the server 300.

Figure 9:
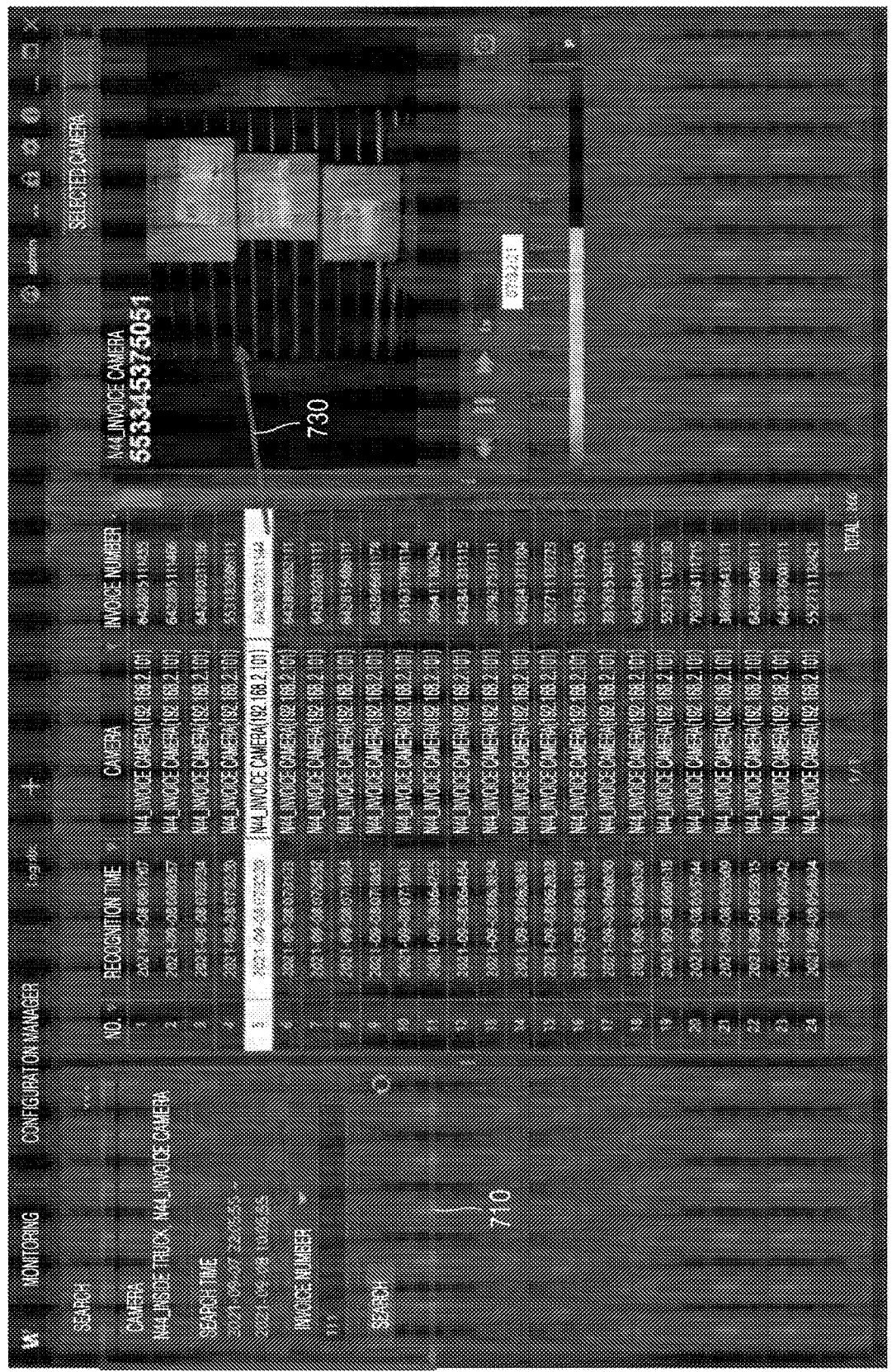
FIGS. 9 and 10 are diagrams for explaining a logistics control method according to an embodiment.
Figure 10:
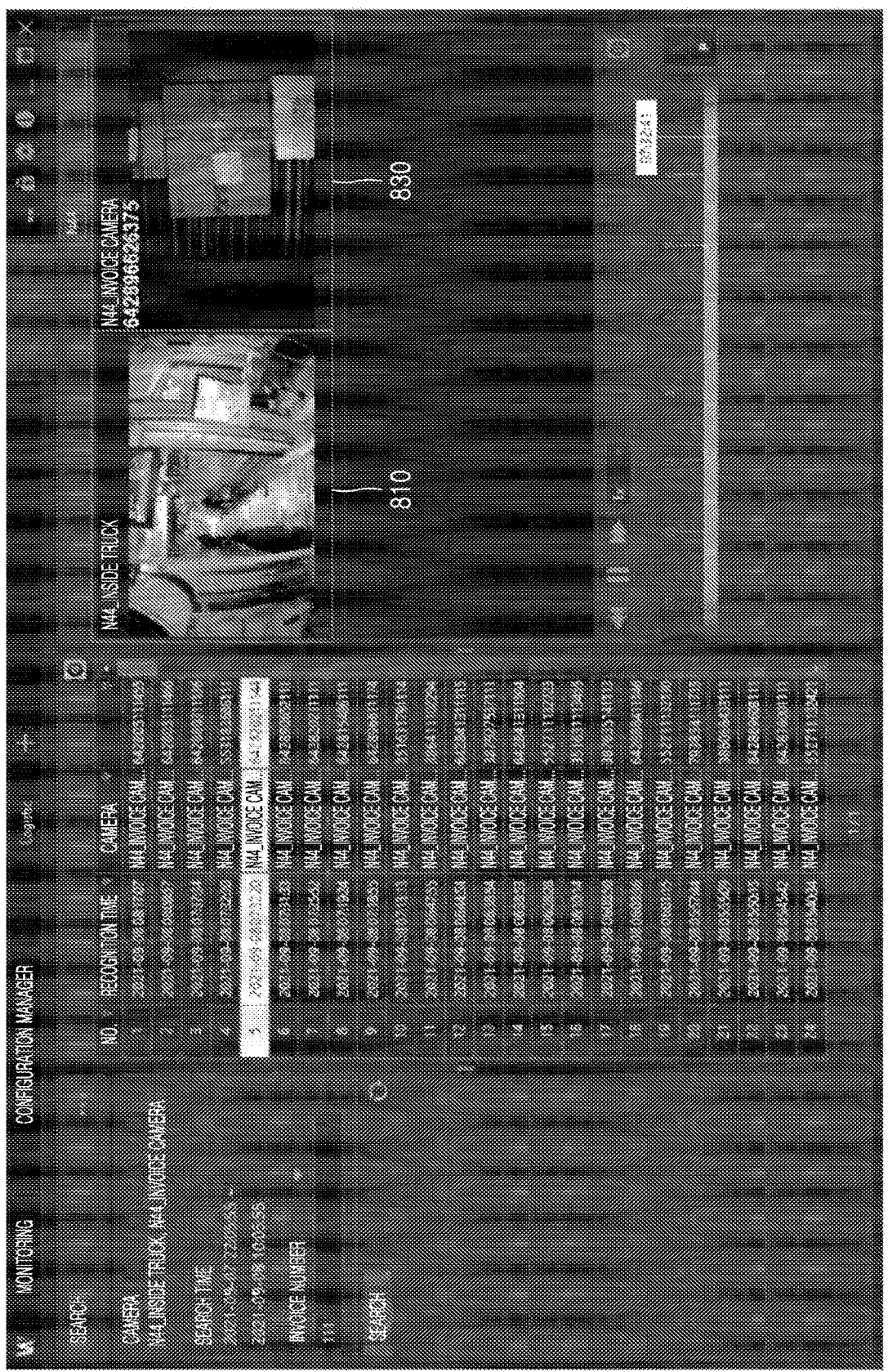

FIGS. 9 and 10 are diagrams for explaining a logistics control method according to an embodiment.

Referring to FIGS. 9 and 10, a user interface screen capable of checking barcode information and image information respectively obtained through a barcode information obtaining module and an image information obtaining module is shown.

For example, as shown in FIG. 9, when an invoice number is input to an invoice number search window 710, image information about an article corresponding to the invoice number may be searched 730 and displayed together on the screen. For example, one image information obtaining module may be selected from among a plurality of image information obtaining modules in the invoice number search window 710. In this case, one piece of image information obtained from the selected one image information obtaining module may be searched.

For example, as shown in FIGS. 9 and 10, a plurality of image information obtaining modules may be selected in the invoice number search window 710. In this case, a plurality of pieces of image information 810 and 830 obtained by the plurality of image information obtaining modules may be searched.

The devices and/or systems described above and illustrated as a block in the drawings, e.g., the barcode information obtaining module 100 and the image information obtaining module 200, may be implemented as hardware components, software components, and/or a combination of hardware components and software components. The devices and components described in the embodiments may be, for example, implemented by using one or more implemented using one or more general-purpose computers or special-purpose computers, such as an arithmetic logic unit (ALU), a digital signal processor, a field programmable gate array (FPGA), a programmable logic unit (PLU), a microprocessor, or any other device that may execute and respond to instructions. A processing device may run an operating system (OS) and one or more software applications running on the operating system. Also, the processing device may also access, store, manipulate, process, and generate data in response to execution of software. For convenience of understanding, a case where one processing unit is used is described, but those skilled in the art will appreciate that a processing device may include multiple processing elements and/or a plurality of types of processing elements. For example, the processing device may include a plurality of processors or a processor and a controller. Also, other processing configurations are also possible, such as parallel processors.

Software may include a computer program, code, instructions, or a combination of one or more thereof, which may configure a processing device to operate as desired or may command the processing devices independently or collectively. Software and/or data may be permanently or temporarily embodied in any tangible machine, component, physical device, virtual equipment, computer storage medium or device, or transmitted signal wave to be interpreted by a processing device or to provide instructions or data to the processing device. Software may be distributed on networked computer systems and stored or executed in a distributed manner. Software and data may be stored on one or more computer-readable recording media.

The method according to an embodiment may be implemented in the form of program instructions that can be executed through various computer units and recorded on a computer readable recording medium. A computer-readable recording medium may include program instructions, data files, data structures, etc. alone or in combination. Program instructions recorded on the medium may be specially designed and configured for the embodiments or may be known and usable to those skilled in computer software. Examples of computer-readable recording media include hardware devices specially configured to store and execute program instructions, such as magnetic media such as hard disks, floppy disks, and magnetic tapes, optical media such as CD-ROMs and DVDs, magneto-optical media such as floptical disks, and ROM, RAM, and flash memory. Examples of program instructions include high-level language codes that can be executed by a computer using an interpreter or the like, as well as machine language codes such as those produced by a compiler. The hardware devices described above may be configured to operate as one or more software modules to perform the operations of the embodiments, and vice versa.

According to an embodiment as described above, a logistics control system and method capable of effectively tracking the moving states of articles by using a camera may be implemented. The scope of the disclosure is not limited by these effects.

It should be understood that embodiments described herein should be considered in a descriptive sense only and not for purposes of limitation. Descriptions of features or aspects within each embodiment should typically be considered as available for other similar features or aspects in other embodiments. While one or more embodiments have been described with reference to the figures, it will be understood by those of ordinary skill in the art that various changes in form and details may be made therein without departing from the spirit and scope of the disclosure as defined by the following claims.

What is claimed is:

1. A camera comprising:
a processor configured to control an operation of the camera;
a barcode information obtaining module provided in the camera and configured to obtain the barcode information attached to an article;
an image information obtaining module, which corresponds to the barcode information obtaining module, configured to obtain the image information about the article and the image information corresponds to the barcode information,
wherein each of the barcode information obtaining module obtains the barcode information of the article and each of the image information obtaining module, which corresponds to each of the barcode information obtaining module, simultaneously obtains the image information about the article,
wherein simultaneously the corresponding image information obtaining module does not obtain the barcode information about the article, and
wherein simultaneously the corresponding barcode information obtaining module does not obtain the image information about the article.

2. A camera comprising at least one processor configured to implement:
a barcode information obtaining module configured to obtain barcode information about an article at a first point;
an image information obtaining module configured to obtain image information about the article at the first point;
wherein simultaneously the barcode information obtaining module obtains the barcode information of the article at the first point and the corresponding image information obtaining module obtains the image information about the article at the first point and wherein simultaneously the corresponding image information obtaining module does not obtain the barcode information about the article at the first point;
wherein the barcode information obtaining module and the image information obtaining module are in one device, wherein the barcode information and the image information obtained separately from each of the barcode information obtaining module and the image information obtaining module are mapped to each other for the article.

3. The camera of claim 2, wherein the processor is further configured to execute the instructions to find out an article with an unrecognized barcode by comparing article information in the barcode information with article information in the image information, and recognize barcode information about the article with the unrecognized barcode by comparing mapped list of the barcode information of articles and list of the image information of articles to each other.

4. A camera comprising:
a processor configured to control an operation of the camera;
a barcode information obtaining module configured to obtain barcode information attached to the article; and
an image information obtaining module configured to obtain the image information about the article,
wherein simultaneously the barcode information obtaining module obtains the barcode information of the article and the corresponding image information obtaining module obtains the image information about the article and wherein simultaneously the corresponding image information obtaining module does not obtain the barcode information about the article,
wherein the barcode information and the image information obtained separately from each of the barcode information obtaining module and the image information obtaining module are mapped to each other for the article.

5. A logistics control system comprising at least one processor configured to implement:
a barcode information obtaining module configured to obtain first barcode information about an article at a first point;

an image information obtaining module configured to obtain first image information about the article at the first point;

wherein simultaneously the barcode information obtaining module obtains the first barcode information of the article at the first point and the corresponding image information obtaining module obtains the first image information about the article at the first point and wherein simultaneously the corresponding image information obtaining module does not obtain the first barcode information about the article at the first point; and a server configured to determine whether the first barcode information is present at the first point based on the first image information about the article at the first point, wherein the first barcode information and the first image information obtained separately from each of the barcode information obtaining module and the image information obtaining module are mapped to each other for the article.

6. The logistics control system of claim 5, wherein the logistics control system further comprising a barcode information obtaining module configured to obtain second barcode information about the article at a second point; and an image information obtaining module configured to obtain second image information about the article at a second point.

7. The logistics control system of claim 6, wherein the server is further configured to determine whether the article is lost between the first point and the second point based on the first barcode information and the first image information, and the second barcode information and the second image information.

* * * * *